United States Patent [19]
Weindling

[11] Patent Number: 5,307,138
[45] Date of Patent: Apr. 26, 1994

[54] ENERGY EFFICIENT MODULATION-DEMODULATION OPTICAL SYSTEM

[75] Inventor: Frederik Weindling, Bridgewater, Conn.

[73] Assignee: Hughes Aircraft Company, Los Angeles, Calif.

[21] Appl. No.: 877,637

[22] Filed: May 1, 1992

[51] Int. Cl.$^5$ .............................................. G01C 3/08
[52] U.S. Cl. ........................................ 356/5; 356/28
[58] Field of Search ................. 356/4, 5, 28; 342/130, 342/131

[56] References Cited

U.S. PATENT DOCUMENTS

| | | | |
|---|---|---|---|
| 3,889,261 | 6/1975 | Sirven | 342/131 |
| 4,163,954 | 8/1979 | Hayes | 356/5 |
| 4,537,502 | 8/1985 | Miller et al. | 356/5 |
| 4,896,159 | 1/1990 | Sabatini et al. | 342/131 |
| 5,001,338 | 3/1991 | Boero | 356/5 X |
| 5,164,733 | 11/1992 | Nettleton et al. | 356/5 X |

*Primary Examiner*—Mark Hellner
*Attorney, Agent, or Firm*—Michael W. Sales; Wanda K. Denson-Low

[57] ABSTRACT

Disclosed is an apparatus for transmitting an optical signal. The apparatus includes a transmitter (12, 14, 18, 20, 26) for transmitting a burst of optical radiation, the burst including first periods of optical radiation having a first wavelength ($\lambda_1$) and second periods of optical radiation having a second wavelength ($\lambda_2$). The first and second periods alternate with one another for a duration of the burst, and each of the periods begins with substantially zero transmitted power, increases to a maximum transmitted power, and decreases to substantially zero power. Also disclosed is a receiver (30) and demodulator (90) that includes a wavelength separator (DG) for separating the received optical radiation into a first portion comprising of radiation of wavelength $\lambda_1$ and a second portion comprising of radiation of wavelength $\lambda_2$. First and second detectors (D1, D2) are responsive to the first and second portions, respectively, for converting the portions into first and second electrical signals, respectively. Circuitry (38, 40, 46) is responsive to the first and to said second electrical signals for determining a doppler shifted difference frequency component thereof ($\Delta f$) that is a result of a relative movement of an object with respect to the apparatus.

10 Claims, 4 Drawing Sheets

ENERGY EFFICIENT MODULATION-DEMODULATION OPTICAL SYSTEM

FIELD OF THE INVENTION

This invention relates generally to an energy efficient modulation-demodulation technique for use with an optical transmitter and receiver.

BACKGROUND OF THE INVENTION

In conventional AM (amplitude-modulation) optical transmission techniques a D.C. level, or pedestal, is transmitted in conjunction with an amplitude-modulated carrier. The D.C. level, however, does not contribute any information to the transmitted AM-signal. Furthermore, transmission of the D.C. level increases the amount of power necessary for transmission of the AM-signal, thereby having an adverse impact on the efficiency of the conventional AM scheme.

FIG. 1A illustrates the waveform of the output signal of a conventional AM modulator. A D.C. level 101 is implicit in this signal. As a consequence, the power transmitted is unnecessarily increased and the efficiency of the conventional AM system is degraded. FIG. 1B illustrates one modulation cycle of a signal transmitted from a conventional AM transmitter. Cross-hatched area 100 represents the energy (E) transmitted, which is expressed as:

$$E = \int_0^{2\pi} (1 - \cos x) dx = 2\pi. \tag{1}$$

The transmission of unnecessary energy may prove disadvantageous in many applications, and it is thus an object of the invention to provide an energy-efficient modulation technique, and also a corresponding demodulation technique.

SUMMARY OF THE INVENTION

In accordance with the invention, a non-coherent sinusoidal amplitude modulation and demodulation technique utilizes either wavelength or polarization diversity to represent positive and negative modulation, respectively. A D.C. level, or pedestal, is not transmitted; therefore the amount of power transmitted is reduced and the efficiency of the modulation-demodulation system is improved. Another advantage of the modulation-demodulation technique of the invention is that the outputs of two separate transmission sources (e.g. laser diodes) are non-coherently combined to provide increased output power.

The modulation-demodulation technique of the invention finds use in laser-based systems for target detection, estimation of target range, and estimation of target range-rate communication systems.

In greater detail there is disclosed an apparatus for transmitting an optical signal. The apparatus includes a transmitter for transmitting a burst of optical radiation, the burst including first periods of optical radiation having a first wavelength ($\lambda_1$) and second periods of optical radiation having a second wavelength ($\lambda_2$). The first and second periods alternate with one another for a duration of the burst, and each of the periods begins with substantially zero transmitted power, increases to a maximum transmitted power, and decreases to substantially zero power. Also disclosed is a receiver and demodulator that includes a wavelength separator for separating the received optical radiation into a first portion comprising radiation of wavelength $\lambda_1$ and a second portion comprising radiation of wavelength $\lambda_2$. First and second detectors are responsive to the first and second portions, respectively, for converting the portions into first and second electrical signals, respectively. Circuitry is responsive to said first and to said second electrical signals for determining a doppler shifted difference frequency component thereof ($\Delta f$) that is a result of a relative movement of an object with respect to the apparatus.

BRIEF DESCRIPTION OF THE DRAWINGS

The above set forth and other features of the invention are made more apparent in the ensuing Detailed Description of the Invention, when read in conjunction with the attached Drawing, wherein.

DETAILED DESCRIPTION OF THE INVENTION

Figure 1A:
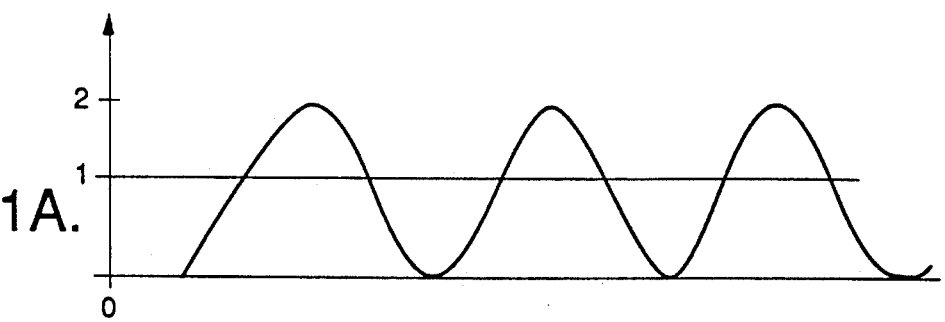
FIG. 1A is an output signal waveform of a conventional AM transmitter.
Figure 1B:
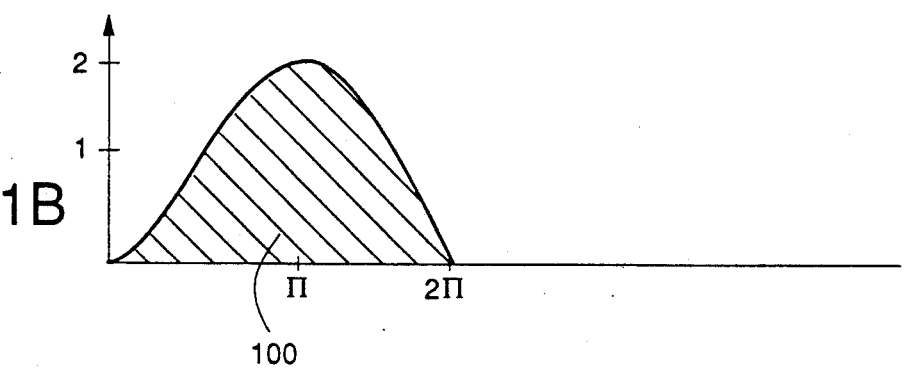
FIG. 1B is one modulation cycle of the conventional amplitude-modulated transmitted signal of FIG. 1A.
Figure 2A:
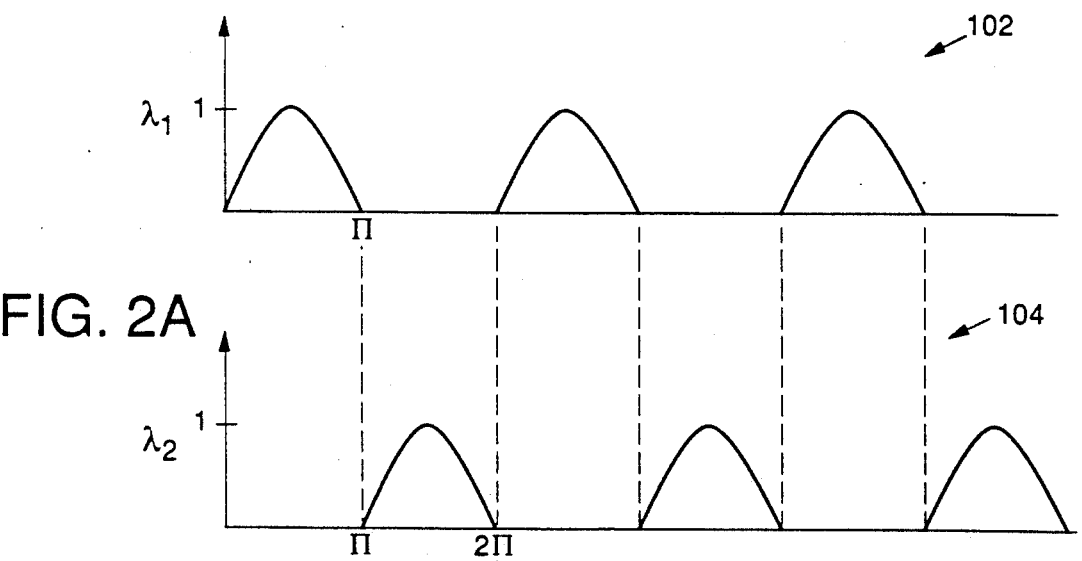
FIG. 2A illustrates modulation envelopes of optical signals that are produced by a modulator of the present invention.
Figure 2B:
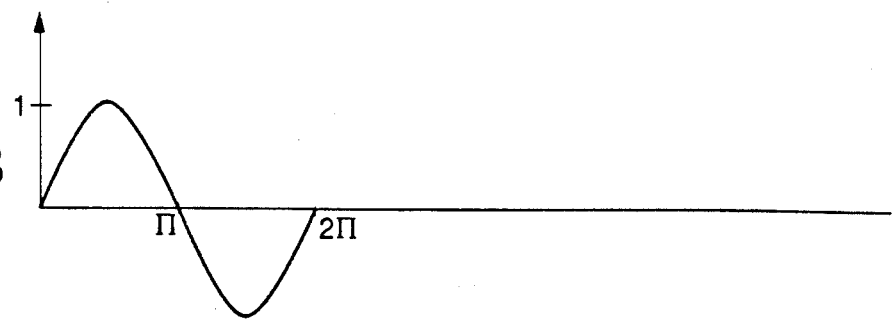
FIG. 2B illustrates a received demodulated two-wavelength optical signal.

It is shown that transmission of a two-wavelength, or two-color, optical signal requires less energy to be transmitted than the convention AM approach described above. FIG. 2A illustrates a two-wavelength optical signal, comprising of optical signals 102 and 104, that is provided by the modulation technique of the invention. This signal requires less energy to be transmitted than the conventional approach. It can be shown that the energy per cycle is:

$$E = 2 \int_0^{\pi} \sin x \, dx = 4. \tag{2}$$

This is an improvement by a factor of $\pi/2$ or 1.57 over the conventional approach described previously and expressed in Eq. 1.

Figure 6:
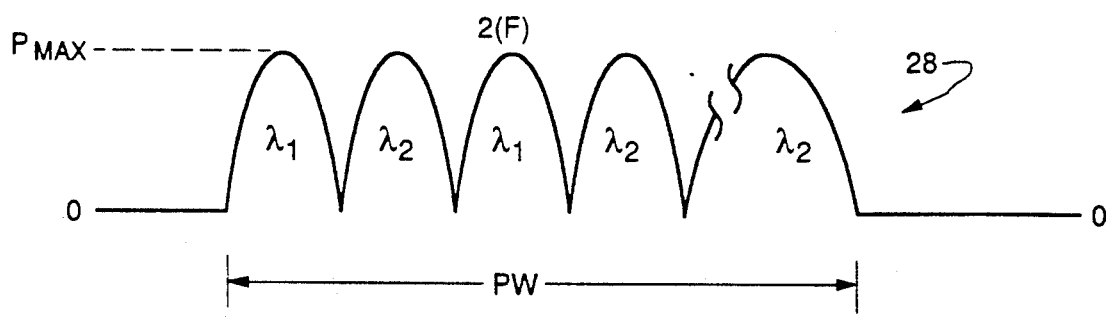
FIG. 6 illustrates a transmitted optical signal burst comprising of alternating periods of first and second wavelength optical signals.
Figure 4:
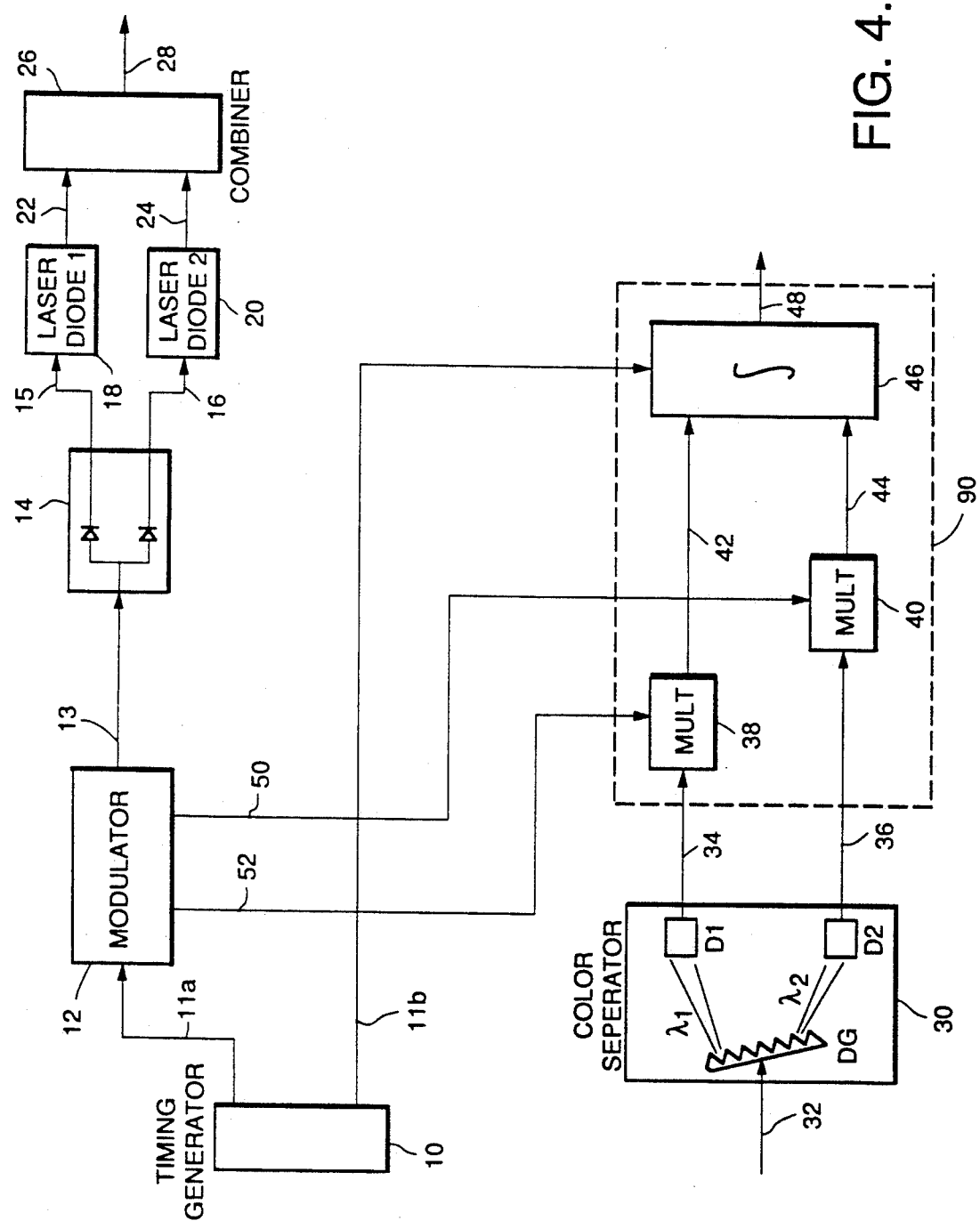
FIG. 4 illustrates an amplitude modulation-demodulation system that is constructed and operated in accordance with the invention.
Figure 5:
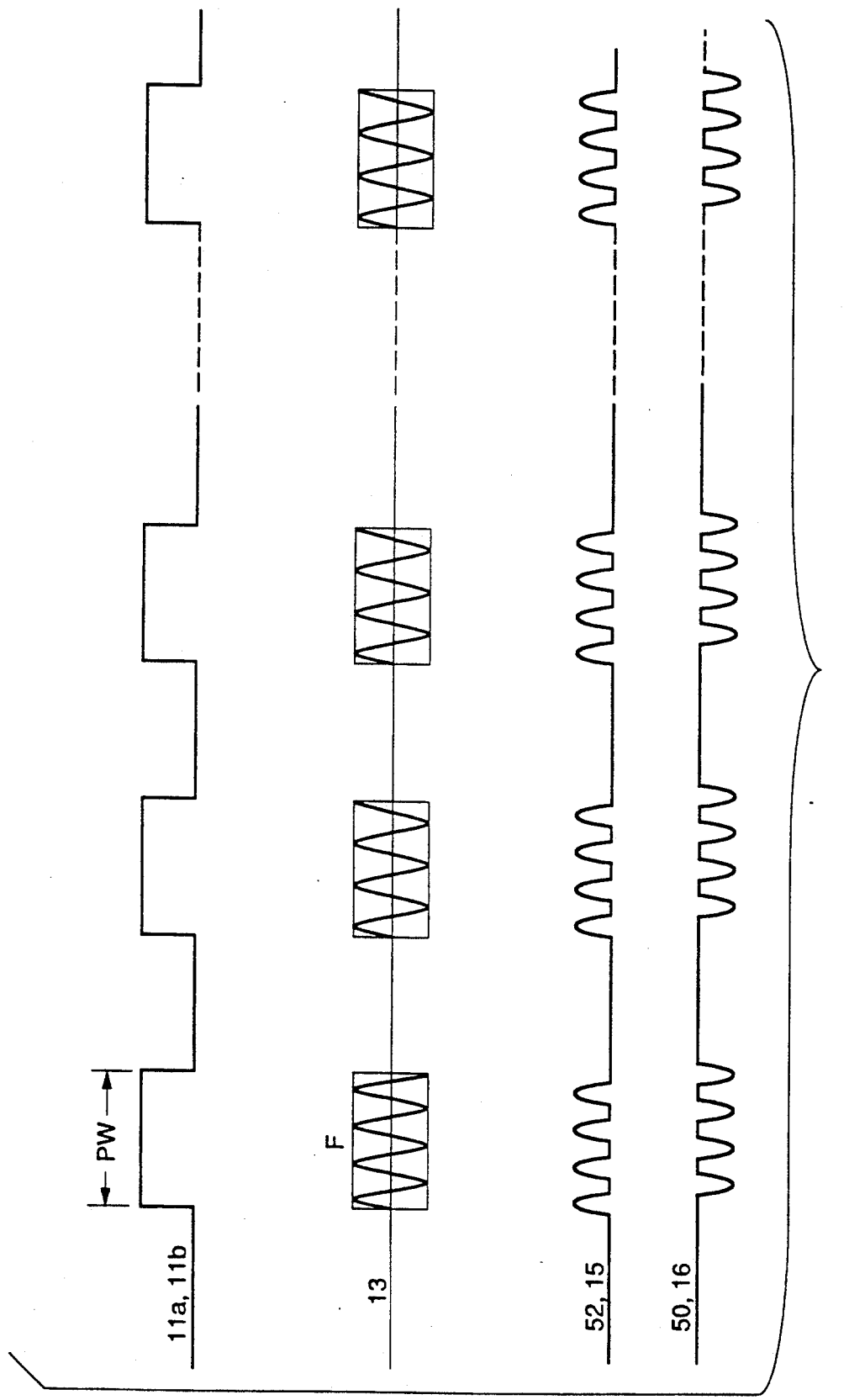
FIG. 5 illustrates various waveforms generated by the system of FIG. 4.

FIG. 4 illustrates an amplitude modulation-demodulation system that is constructed and operated in accordance with the invention. Modulator 12 has an input and first, second and third outputs. The input is coupled to a timing generator 10 which supplies pulse trains 11a and 11b, as seen in FIG. 5. Modulator 12 includes an internal local oscillator that generates a modulating signal. In a preferred embodiment of the invention, the frequency (F) of the modulating signal is 300 MHz, although other frequencies may be used. Modulator 12 outputs at the first output periodic bursts 13 (FIG. 5) of the carrier signal. The repetition rate of the bursts is equal to the frequency of the pulse train 11a, and the period of the burst is equal to the width of pulse 11a. Modulator 12 provides at the second output a reference signal 52 comprising periodic bursts of positive-polarity portions of the carrier signal. Modulator 12 provides at the third output a reference signal 50 comprising periodic bursts of negative-polarity portions of the carrier signal. The first output of modulator 12 is coupled to an input of a steering network, such as a diode network 14. Diode network 14 separates bursts 13 into two separate signals 15 and 16, where signal 15 represents the positive-polarity portions of each burst 13, and signal 16 represents negative-polarity portions of burst 13. Signals 15 and 16 are inputted into laser diodes 18 and 20 respectively. Laser diode 18 outputs an optical signal 22 having a first wavelength ($\lambda_1$), or color, in response to the positive-polarity signal 15. By example, $\lambda_1$ is equal to 800 nanometers (nm). Similarly, laser diode 20 outputs an optical signal 24 having a second wavelength ($\lambda_2$), or color, in response to the negative-polarity signal. By example, $\lambda_2 = 880$ nm. Optical signals 22 and 24 are inputted into optical combiner 26 which combines both optical signals 22 and 24 onto a common optical path. In a preferred embodiment, optical combiner 26 is a half-silvered mirror. The optical combiner 26 outputs an optical signal 28, as shown in FIG. 6, that comprises consecutive periods of optical energy having wavelengths of $\lambda_1$ and $\lambda_2$ and a frequency of 2F. Each period is approximately the shape of one-half of a sinewave. In a presently preferred embodiment of the invention, signals 15 and 16 are applied to laser diode power supply terminals to modulate the operating power of each of the laser diodes to achieve the approximately half-sinusoid pulse shape.

The optical signal 28 is typically transmitted through space and may be employed for range or range-rate estimation of targets, where the transmitted optical signal is reflected from a target. Thus, the invention also provides for reception and demodulation of a reflected, two-color optical signal that is generated as described above.

Referring again to FIG. 4, the received or "reflected" optical signal 32 is applied at an input of color separator 30. In a preferred embodiment of the invention, color separator 30 includes a diffraction grating (DF), filter, and a pair (D1, D2) of detectors for receiving the diffraction input signal. The outputs of color separator 30 are two electrical signals 34 and 36 corresponding to the received energy for $\lambda_1$ and $\lambda_2$, respectively. Detector signals 34 and 36, possibly having Doppler-shifted wavelength information if the target range is not constant, are inputted into a demodulator 90. Demodulator 90 includes multipliers 38 and 40 and integrator 46. Signal 34 is inputted into multiplier 38. Reference signal 52, which is outputted from modulator 12, is also inputted into multiplier 38. Multiplier 38 outputs a signal 42 representative of a product of the amplitude of signal 34 and the reference signal 52. Similarly, optical signal 36 is inputted into multiplier 40. Reference signal 50, which is outputted from modulator 12, is also inputted into multiplier 40. Multiplier 40 outputs a signal 44 representative of a product of the amplitudes of optical signal 36 and reference signal 50. The output signals 42 and 44 of multipliers 38 and 40, respectively, are inputted into integrator 48 which integrates both input signals 42 and 44 over a unit of time equal to a pulse width of clock signal 11b.

As such, demodulator 90 performs a correlation function on the separated optical signals 34 and 36 and reference signals 52 and 50, respectively. The output signal 48 is expressive of a difference between the modulation frequency, as conveyed by signals 50 and 52, and the doppler-shifted modulation of the reflected signal, 32.

Figure 3:
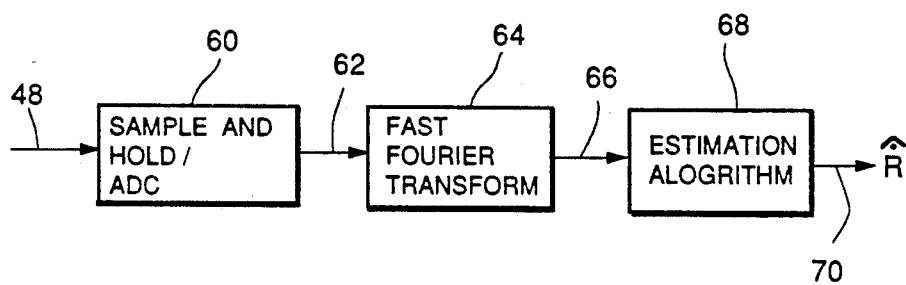
FIG. 3 illustrates an information processing network utilized to determine range rate.

FIG. 3 is a block diagram of a range-rate finding subsystem which, when used in conjunction with the modulation-demodulation system of the present invention, provides target range-rate information.

Demodulator output signal 48 is inputted into an analog to digital converter 60 where it is processed by an internal sample-and-hold function. The sampled signal is converted into an (n)-bit digital word 62 that is inputted into FFT (fast fourier transform) module 64. FFT module 64 performs a fast fourier transform analysis on the (n)-bit digital word 62, and generates a spectrum of peaks expressive of the frequency content of the received signal 32 over the integration period. An estimation algorithm block 68 is coupled to an output 66 of the FFT block 64 and selects a peak as representative of $\Delta f$, that is, the difference frequency due to doppler shift, which is the desired result. If the target is stationary, the doppler shift equals zero.

Based on the foregoing teaching, those having skill in the art may derive a number of modifications to the embodiment of the invention disclosed above. For example, the use of the invention is not restricted to laser diode wavelength sources. That is, the coherency of the optical signals is not of great concern and light emitting diodes (LEDs) of different wavelengths may be employed, so long as the LEDs generate sufficient power. Furthermore, three or more wavelengths could be transmitted and received, instead of only the two illustrated, Thus, the invention is not to be construed to be limited only to the disclosed embodiment, but it is instead intended to be limited only as defined by the appended claims.

I claim:

1. Apparatus for transmitting an optical signal, comprising:

transmitter means for transmitting a burst of optical radiation, the burst including first periods of optical radiation having a first wavelength ($\lambda_1$) in response to a portion of a carrier signal having a first polarity and second periods of optical radiation having a second wavelength ($\lambda_2$) in response to a portion of said carrier signal having a second polarity, the first and second periods alternating with one another for a duration of the burst, each of said periods beginning with substantially zero transmitted power, increasing to a maximum transmitted power, and decreasing to substantially zero power.

2. Apparatus as set forth in claim 1 wherein, during each of said periods, the transmitted power increases and decreases in an approximately sinusoidal manner.

3. Apparatus as set forth in claim 1 wherein said transmitted means includes a first optical source for generating ($\lambda_1$), a second optical source for generating ($\lambda_2$), and control means, coupled to said first and to said second optical sources, for alternately enabling one and then the other to generate their respective wavelengths.

4. Apparatus as set forth in claim 3 wherein said control means includes a local oscillator for generating a signal having a frequency (f), and wherein said first and said second periods occur at a frequency of 2(f).

5. Apparatus as set forth in claim 3 wherein said first optical source and said second optical source each include a laser diode.

6. Apparatus as set forth in claim 4 and further including means for receiving a portion of the burst of optical radiation that reflects from an object, said receiving means including:

means for separating the received optical radiation into a first portion comprising radiation of wavelength $\lambda_1$ and a second portion comprising of radiation of wavelength $\lambda_2$;

first and second detector means responsive to said first and second portions, respectively, for converting said portions into first and second electrical signals, respectively; and means, responsive to said first and to said second electrical signals, for determining a doppler shifted difference frequency component thereof ($\Delta f$) that is a result of a relative movement of object with respect to the apparatus.

7. Apparatus as set forth in claim 6 wherein said determining means includes:

first multiplier means, having a first input coupled to said first electrical signal and a second input coupled to a first reference signal output by said control means during each of said first periods, for multiplying said first electrical signal by said first reference signal;

second multiplier means, having a second input coupled to said second electrical signal and a second input coupled to a first reference signal output by said control means during each of said second periods, for multiplying said second electrical signal by said second reference signal; and integrator means, having a first input coupled to an output of said first multiplier means and a second input coupled to an output of said second multiplier means, for integrating said outputs over a duration of said burst.

8. Apparatus for generating and receiving a two-wavelength optical signal comprising:

means for generating, at any given time, either a first optical signal having a first wavelength or a second optical signal having a second wavelength, the generating means being responsive to periodic bursts of a modulating signal having a first frequency, the generating means generating the first optical signal in response to a portion of a carrier signal having a first polarity, the generating means generating the second optical signal in response to a portion of the carrier signal having a second polarity;

means for combining onto a common optical transmission path the first optical signal and the second optical signal;

means for receiving the first and the second optical signals, the receiving means including optical separation means having as an input a received optical signal, the optical separation means separating the received optical signal into a first received optical signal and a second received optical signal; and means for detecting, from a received demodulation of said first and said second optical signals, a doppler shift induced by a relative motion of an object from which the received optical signals reflect.

9. Apparatus as set forth in claim 8 wherein said generating means includes a first laser diode for generating the first wavelength and a second laser diode for generating the second wavelength.

10. Apparatus for generating and receiving a two-wavelength optical signal, comprising:

modulation means having an input and first, second and third outputs, the input being coupled to a first signal having a period of P, the modulation means outputting at the first output a series of bursts of a signal having frequency $F_1$, the modulation means outputting each burst for a period equal to P, the modulation means outputting at the second output a signal representative of a portion of the series of bursts having a first polarity, the modulation means outputting at the third output a signal representative of a portion of the series of bursts having a second polarity;

steering means having an input, a first output, and a second output, the steering means providing at its first output a signal representative of the portion of the series of bursts having the first polarity, the steering means providing at the second output a signal representative of the portion of the series of bursts having the second polarity;

a first laser diode having an input coupled to the first output of the steering means, the first laser diode generating a first output wavelength in response to the first output of the steering means;

a second laser diode having an input coupled to the second output of the steering means, the second laser diode generating a second output wavelength in response to the second output of the steering means;

optical radiation transmitting means for combining onto a common optical transmission path the output of the first laser diode and the output of the second laser diode;

optical receiver means including optical separation means having as an input a received optical signal corresponding to a portion of the transmitted optical radiation that reflects from an object, the optical separation means separating the optical signal into first and second optical signals having first and second wavelengths, respectively; and means for comparing to $F_1$, during a period of time equal to P, a frequency ($F_2$) of the modulation envelope of the received optical signal for determining an amount of doppler shift, if any, induced in transmitted optical signal.

* * * * *